(12) United States Patent
Chen

(10) Patent No.: US 10,188,888 B2
(45) Date of Patent: *Jan. 29, 2019

(54) SPRING ENCLOSED TRAMPOLINE

(71) Applicant: Samuel Chen, Hong Kong (CN)

(72) Inventor: Samuel Chen, Hong Kong (CN)

( * ) Notice: Subject to any disclaimer, the term of this patent is extended or adjusted under 35 U.S.C. 154(b) by 50 days.

This patent is subject to a terminal disclaimer.

(21) Appl. No.: 15/481,779

(22) Filed: Apr. 7, 2017

(65) Prior Publication Data

US 2017/0319886 A1    Nov. 9, 2017

Related U.S. Application Data

(63) Continuation-in-part of application No. 15/438,532, filed on Feb. 21, 2017.

(60) Provisional application No. 62/333,732, filed on May 9, 2016.

(30) Foreign Application Priority Data

Dec. 30, 2016    (CN) .................... 2016 2 1476086 U

(51) Int. Cl.
| | |
|---|---|
| *A63B 5/11* | (2006.01) |
| *F16F 15/073* | (2006.01) |
| *F16F 1/26* | (2006.01) |
| *F16F 1/18* | (2006.01) |
| *F16F 1/28* | (2006.01) |
| *A63B 71/02* | (2006.01) |
| *A63B 21/02* | (2006.01) |

(52) U.S. Cl.
CPC .............. *A63B 5/11* (2013.01); *A63B 71/022* (2013.01); *F16F 1/182* (2013.01); *F16F 1/187* (2013.01); *F16F 1/26* (2013.01); *F16F 1/28* (2013.01); *F16F 15/073* (2013.01); *A63B 21/026* (2013.01); *A63B 2210/50* (2013.01)

(58) Field of Classification Search
CPC ........ A63B 5/11; A63B 71/0054; F16F 1/182; F16F 1/26

See application file for complete search history.

(56) References Cited

U.S. PATENT DOCUMENTS

| | | | |
|---|---|---|---|
| 9,492,698 B2 * | 11/2016 | Andon | A63B 5/11 |
| 9,643,039 B2 * | 5/2017 | Andon | A63B 5/11 |
| 2013/0210590 A1 * | 8/2013 | Publicover | A63B 5/11 482/110 |
| 2016/0296781 A1 * | 10/2016 | Andon | A63B 5/11 |
| 2017/0080270 A1 * | 3/2017 | Andon | A63B 5/11 |
| 2017/0120094 A1 * | 5/2017 | Andon | A63B 5/11 |

(Continued)

*Primary Examiner* — Megan Anderson

(74) *Attorney, Agent, or Firm* — Clement Cheng

(57) ABSTRACT

A spring enclosure trampoline includes a trampoline bed connected across a horizontal frame member. The trampoline bed is supported by a plurality of springs. Trampoline legs support the horizontal frame member above a ground surface. A trampoline enclosure supports a trampoline enclosure net from a spring enclosure netting support. The trampoline enclosure surrounds the trampoline bed and the trampoline enclosure is supported on a trampoline pole. The spring enclosure netting support is formed as a leaf spring. The leaf spring is flexible in a horizontal direction and in a vertical direction. A leaf spring vertical dimension is greater than the leaf spring horizontal dimension. A horizontal spring constant of the leaf spring, and a vertical spring constant of the leaf spring are different.

15 Claims, 8 Drawing Sheets

(56) References Cited

U.S. PATENT DOCUMENTS

2017/0333741 A1* 11/2017 Chen ................ A63B 5/11
2018/0036570 A1* 2/2018 Chen ................ A63B 5/11

* cited by examiner

SPRING ENCLOSED TRAMPOLINE

This application is a non-provisional of U.S. provisional application 62/333,732 filed May 9, 2016, entitled Spring Enclosed Trampoline, by inventor Samuel Chen, the disclosure which is incorporated herein by reference. This application claims priority from United States patent application entitled Spring Enclosed Trampoline filed Feb. 21, 2017 having application Ser. No. 15/438,532 by same inventor Samuel Chen, the disclosure which is incorporated herein by reference. This application also claims foreign priority from China application number 201621476086.6 entitled Trampoline Enclosure Device filed Dec. 30, 2016 by applicant Xiamen Dmaster Health Technology Co., Ltd., now assigned to Sportspower Limited, the disclosure of which is incorporated herein by reference.

FIELD OF THE INVENTION

The present invention is in the field of trampoline enclosures.

DISCUSSION OF RELATED ART

Trampoline is a popular sport and recently enclosures have been developed for retaining users such as children within the jumping area. The trampoline enclosure is typically supported by trampoline poles that hold up a trampoline enclosure support. Trampoline enclosure supports have been framed from fiberglass rods, such as plastic wrapped fiberglass rods. Additionally, trampoline wires have provided for both substantially inflexible supports and substantially flexible supports. An inflexible support has improved strength for retaining a user, but a flexible support has improved safety when a user contacts the enclosure support during a jump. The enclosure of the trampoline can also be hung loosely on upright poles with the enclosure netting between the poles hanging naturally.

The trampoline support frame can be furnished with a substantially rigid mesh net support to provide a stronger support, but this can make assembly more difficult. Users sometimes require tools and keeping track of small components such as screws. Having long rods also makes the assembly more difficult.

SUMMARY OF THE INVENTION

An object of the present invention is to provide a spring connection between trampoline enclosure poles to improve dynamic catching of users that fall onto trampoline enclosure netting while at the same time providing a flexible support in case a user contacts the enclosure support during a jump.

A spring enclosure trampoline includes a trampoline bed connected across a horizontal frame member. The trampoline bed is supported by a plurality of springs. Trampoline legs support the horizontal frame member above a ground surface. A trampoline enclosure supports a trampoline enclosure net from a spring enclosure netting support. The trampoline enclosure surrounds the trampoline bed and the trampoline enclosure is supported on a trampoline pole. The spring enclosure netting support is formed as a leaf spring. The leaf spring is flexible in a horizontal direction and in a vertical direction. A leaf spring vertical dimension is greater than the leaf spring horizontal dimension. A horizontal spring constant of the leaf spring, and a vertical spring constant of the leaf spring are different.

The horizontal spring constant is less than the vertical spring constant so that the leaf spring is resiliently flexible in a vertical direction and in a horizontal direction, but is more stiff in a vertical direction. An enclosure sleeve of the trampoline enclosure supports the trampoline enclosure net, which is suspended from the enclosure sleeve.

Preferably, the leaf spring is formed from multiple sections connected together at a leaf spring connector. The leaf spring has a pair of leaf spring openings that receive bolts secured by nuts. The pair of leaf spring openings can include a leaf spring first opening and a leaf spring second opening. The leaf spring has a leaf spring cover fitted over at least an upper edge of the leaf spring. The leaf spring retainer can be attached to the trampoline pole. The leaf spring retainer has a retainer slot that clips the leaf spring to limit rotation of the leaf spring within the retainer slot. The spring enclosure trampoline may also have a leaf spring cover laminated over at least a portion of the leaf spring.

A leaf spring can also have an adjacent leaf spring. Each leaf spring would have a pair of adjacent leaf springs. An adjacent leaf spring has a head and an end. The end can be fitted with a connecting sleeve. The connecting sleeve preferably has a buckle that can be used as a snap buckle for snap fit connection without tools. The buckle secures the leaf spring to the adjacent leaf spring. The buckle has a pair of clamping parts, including an upper clamping part and a lower clamping part. The pair of clamping parts engages a pair of grooves formed on a head portion of the adjacent leaf spring, and the upper clamping part engages an upper groove. The lower clamping part engages a lower groove. The connecting sleeve is connected to the end of the adjacent leaf spring by a bolt or screw. The leaf spring also has a pair of bevels formed on the end of the leaf spring. The bevels are configured to expand the buckle when the pair of bevels is inserted through the buckle. The buckle is formed as a wire clip.

Figure 1:
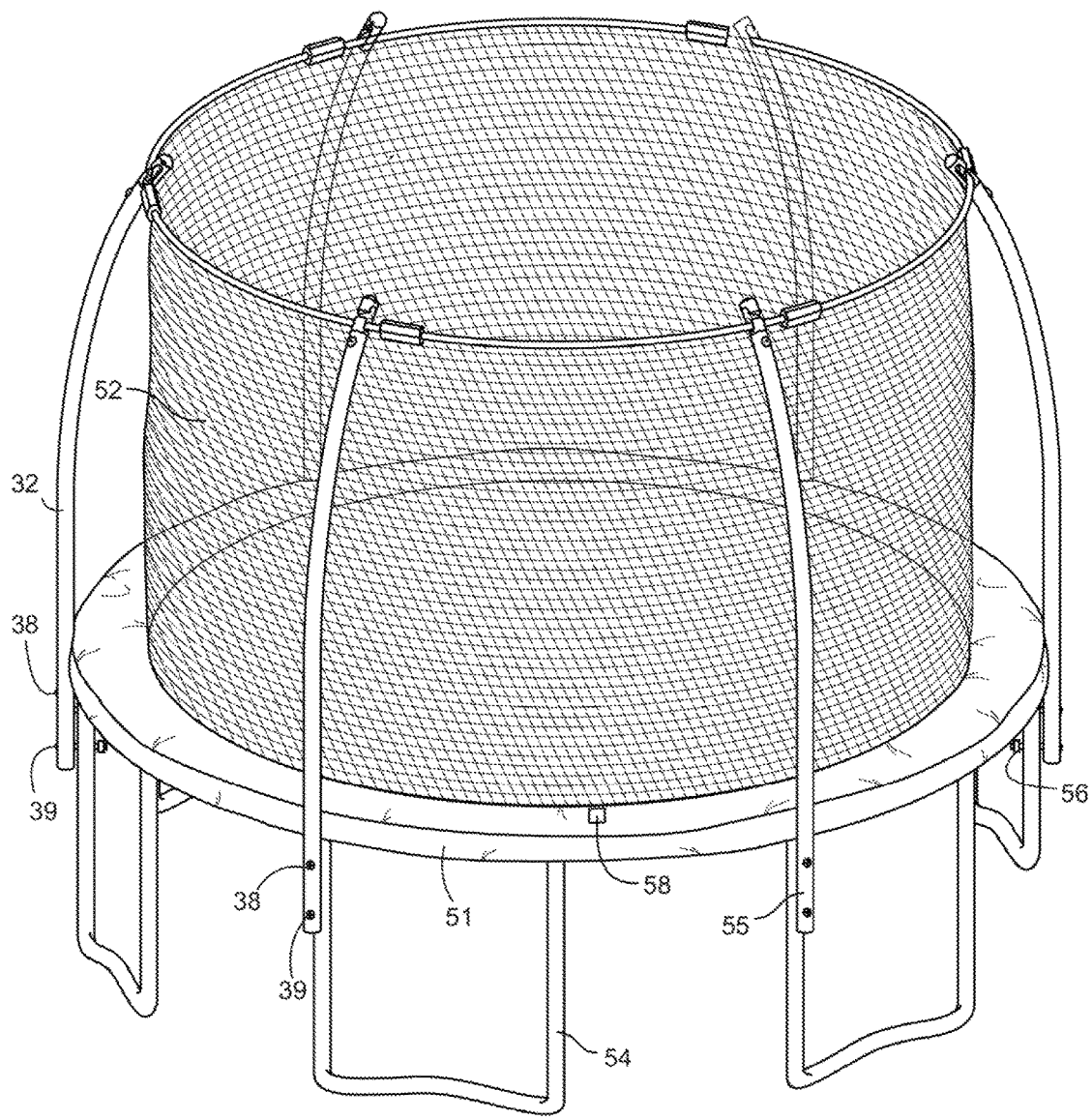
FIG. 1 is an environmental perspective view of a trampoline.

The following call out list of elements can be a useful guide in referencing the element numbers of the drawings.
10 Pad
15 Bed
20 Retainer Dome
21 Retainer Dome Rim
22 Angled Slot
23 Angled Slot Hook
24 Capturing Cavity Flat Lower Face
25 Capturing Cavity Flat Inside Face
26 Retainer Sidewall
27 Capturing Cavity Angled Slot Slope
28 Capturing Cavity Arched Ceiling
29 Capturing Cavity
30 Horizontal Frame Member
32 Enclosure Poles
38 First Enclosure Pole Connector
39 Second Enclosure Pole Connector
40 Spring Enclosure Netting Support
141 Leaf Spring Vertical Dimension
142 Leaf Spring Horizontal Dimension
143 Leaf Spring Connector
144 Leaf Spring First Opening
145 Leaf Spring Second Opening
46 First Bolt
47 Second Bolt
48 First Nut
49 Second Nut
51 Trampoline Frame
52 Net
53 Upper Enclosure Support
54 Trampoline Leg
55 Enclosure Pole Connection
56 Enclosure Pole Connection Nut
58 Spring Cover
60 Leaf Spring Cover
61 Tacky Film
62 Leaf Spring Retainer
63 Retainer Slot
64 Enclosure Sleeve
65 Leaf Spring Retainer Outside Tube
66 Leaf Spring Retainer Inside Tube
67 Leaf Spring Retainer Tube Gap
68 Leaf Spring Retainer Inside Tube Hollow
69 Leaf Spring Retainer Connector Opening
2 Support frame
3 Enclosure
4 Mesh Connecting Unit
41 Leaf Spring
411 Head
412 End
413 Buckling part
414 Guide bevel
415 Groove
42 Connecting sleeve
421 Threading slot
43 Buckle
431 Base
432 Clamping part
44 Screw
9 Trampoline

DETAILED DESCRIPTION OF THE PREFERRED EMBODIMENT

As seen in FIG. 1, a trampoline generally has a trampoline frame 51 having a ring of horizontal members. The trampoline frame 51 is connected to multiple trampoline legs 54. The trampoline legs 54 are U-shaped and connected to the trampoline frame 51 to support the trampoline frame 51 above the ground. The trampoline legs have enclosure poles 32 connected to them. The enclosure poles 32 are connected to the trampoline legs at an enclosure pole connection 55. The enclosure pole connection 55 includes a first enclosure pole connector 38 and a second enclosure pole connector 39 which can be formed of a screw or bolt for example. The enclosure pole connection nut 56 can thread to the enclosure pole connectors when the enclosure pole connectors are formed as bolts. The enclosure poles 32 support an upper enclosure support 53. The upper enclosure support 53 has a net 52 suspended from the upper enclosure support. The net 52 retains users bounding on the trampoline bed. The trampoline bed is connected to the trampoline frame 51 at a plurality of springs that are covered by spring cover 58. The trampoline enclosure surrounds the trampoline bed along a circumferential periphery and has a top portion open.

Figure 2:
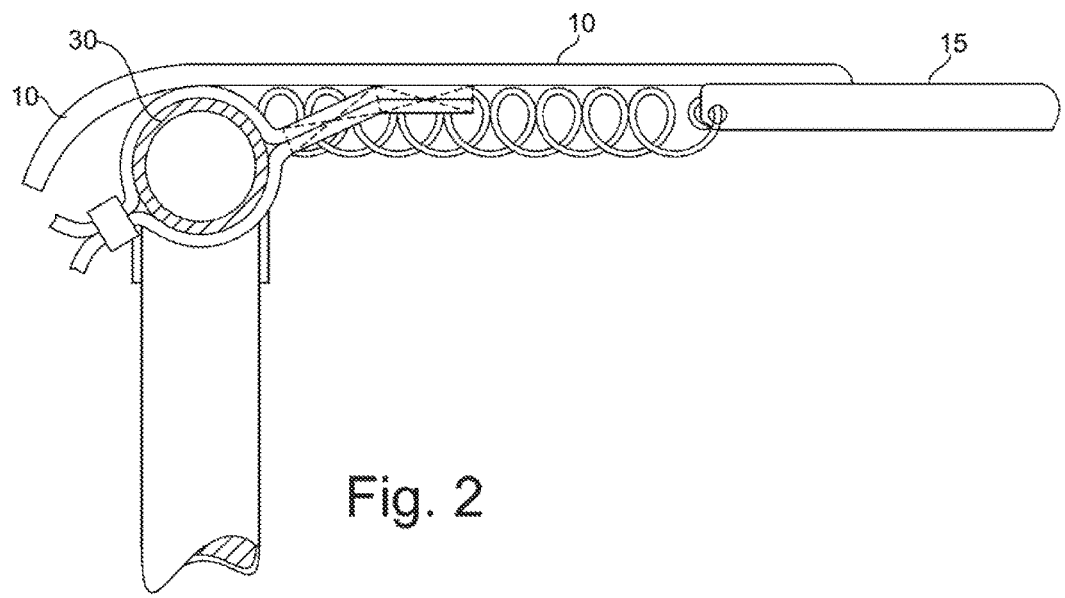
FIG. 2 is a cross-section view of the trampoline frame, springs and trampoline pad connection.

As seen in FIG. 2, the trampoline frame supports the bed 15, pad 10, springs and user. The trampoline frame is commonly circular when seen from a top plan configuration and made of horizontal tubular members, having a number of vertical support legs attached to the horizontal tubular members. The trampoline frame can also be rectangular. The trampoline frame retains a plurality of springs that in turn retain the trampoline surface. The trampoline frame is formed of vertical members and horizontal members 30. The vertical and horizontal members 30 travel around the periphery of the trampoline bed 15. Horizontal members 30 are supported by vertical members. The horizontal members connect to vertical members at a T joint connector provided for interconnecting adjacent ends of each top member section. The vertical members support the T joint connectors.

Figure 3:
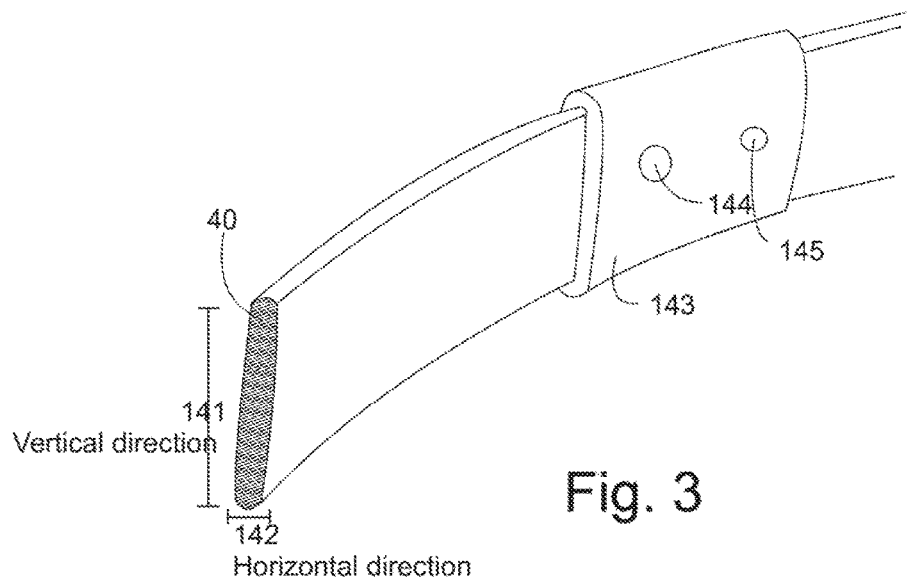
FIG. 3 is a close-up view of a spring enclosure netting support showing a connection between different sections of the leaf spring.

As seen in FIG. 3, the trampoline enclosure has an upper enclosure support 53 that can be formed as a spring enclosure netting support 40. The spring enclosure netting support 40 is formed as one or more leaf springs connected to each other in a circular or oval shape. The leaf spring has a vertical dimension 141 and a horizontal dimension 142. The vertical dimension is greater than the horizontal dimension. Preferably, the vertical dimension or height of the leaf spring is about 10-12 mm while the horizontal dimension is about 1-2 millimeters. The spring enclosure netting support is held within a sleeve of the enclosure net that conforms to the circular or oval shape of the leaf spring when seen from the top view.

Although described as a leaf spring, the spring can also be described as a plate spring. The leaf spring has a pair of ends such as a first end and a second end. When only a single leaf spring is used, the single leaf spring can have the first end connected to the second end to form a loop such as a circular or oval shaped loop.

The leaf spring can be connected by a leaf spring connector 143 such as a clamp. The clamp can have a pair of set screws or securing connectors that pass through a surface of the leaf spring. The leaf spring first end and the leaf spring second end can both have an opening for receiving a pair of bolt connectors. The leaf spring can have a leaf spring first opening 144 adjacent to a leaf spring second opening 145. The leaf spring first opening 144 and the leaf spring second opening 145 are preferably parallel to each other along a median line of the leaf spring. The leaf spring can be formed in sections such as in four sections.

Figure 4:
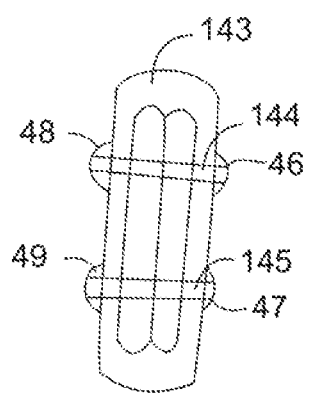
FIG. 4 is a cross-section view of a first leaf spring section and a second leaf spring section bolted together inside a plastic connector.

As seen in FIG. 4, the first bolt 46 can insert through the leaf spring first opening 144 and the second bolt 47 can insert through the leaf spring second opening 145. The first nut 48 connects to the first bolt 46 and the second nut 49 connects to the second bolt 47. The leaf spring also has a leaf spring cover 60. The leaf spring cover is preferably made of a plastic sheathing that covers the leaf spring along its periphery. The plastic sheathing can be made as a polypropylene tubing that has either a circular cross-section or a cross-section that conforms to the flat leaf spring shape.

The leaf spring is substantially flexible along its entire length and provides support to the trampoline poles 32 to interconnect the trampoline poles 32 at upper ends of the trampoline poles. The upper ends of the trampoline poles 32 are flexibly inter-connected to each other while remaining not free. From a top view, the flat leaf spring forms a leaf spring ring.

The leaf spring responds differently when receiving bias from a horizontal direction as compared to receiving bias from a vertical position. During regular jumping, the spring enclosure netting support 40 resiliently attenuates frame vibrations and can dampen cyclical stress between the upper ends of the trampoline enclosure poles 32. When a user lands on the enclosure net, the leaf spring flexes to catch the user. Because the leaf spring is connected to all of the trampoline poles at the upper ends of the trampoline poles, the leaf spring flexes to change the shape of its profile. The leaf spring receives a force in a downward direction causing the leaf spring to buckle.

The leaf spring has a first spring constant in the horizontal direction, also called a horizontal direction spring constant. The leaf spring also has a second spring constant in the vertical direction, also called a vertical direction spring constant. The spring constant in the horizontal direction is less than the spring constant in the vertical direction.

After the trampoline enclosure catches the user, the user preferably does not contact the ground. The sleeve of the trampoline enclosure net preferably at least partially bears the weight of the user and preferably prevents the user from contacting the ground. The leaf spring flexibly restores the shape of the enclosure net to the original neutral position after the user is no longer biasing the trampoline enclosure net.

Figure 5:
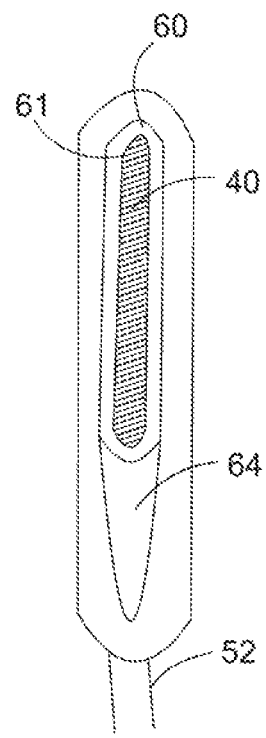
FIG. 5 is a cross-section view of the enclosure sleeve fitting over the leaf spring.

Optionally, as seen in FIG. 5, the leaf spring is encapsulated within a laminate such as a plastic sheath formed as the leaf spring cover 60. The leaf spring cover 60 can be a high density plastic tube such as a polyethylene tube. The leaf spring cover 60 can be thermally laminated to the metal of the leaf spring with a tacky polyolefin film that acts as a double-sided adhesive tape when heated. The tacky film 61 can be introduced at an interface between the leaf spring cover 60 and the spring enclosure netting support 40. The leaf spring has a flat surface that can receive a strip of tacky film 61 on an inside and outside surface of the leaf spring. The tacky film 61 can retain the enclosure sleeve 64 to the leaf spring cover 60.

Figure 6:
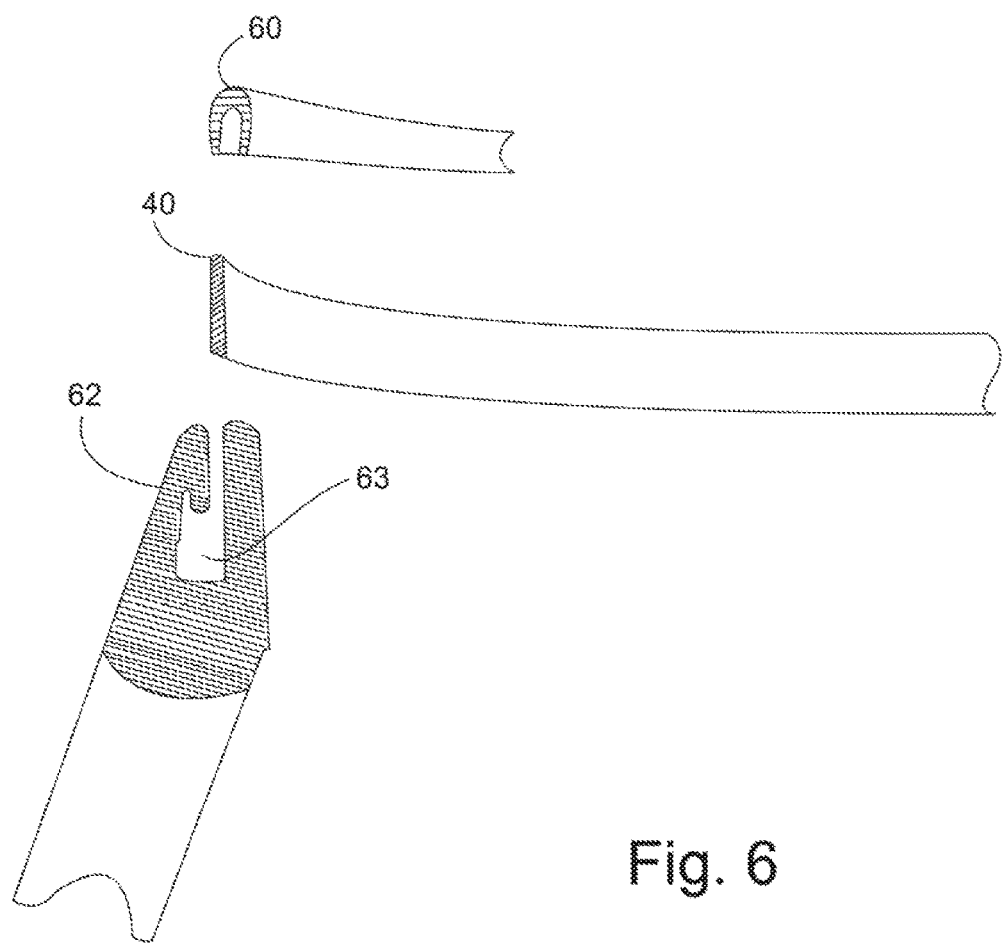
FIG. 6 is an exploded view of the present invention showing construction of the leaf spring.

As seen in FIG. 6, a leaf spring retainer 62 can have a retainer slot 63. The retainer slot 63 has a variety of features for capturing and retaining the leaf spring hoop. When inserted into the retainer slot 63, the leaf spring maintains a generally vertical orientation, although the leaf spring does bend to accommodate the retainer slot 63. In neutral position, the leaf spring would be completely vertical, but the leaf spring being a spring can be biased for purposes of insertion. The retainer slot 63 generally includes a retainer dome 20 defined above a retainer dome rim 21. The retainer dome rim 21 extends downwardly along a cylindrical retainer sidewall 26.

Figure 12:
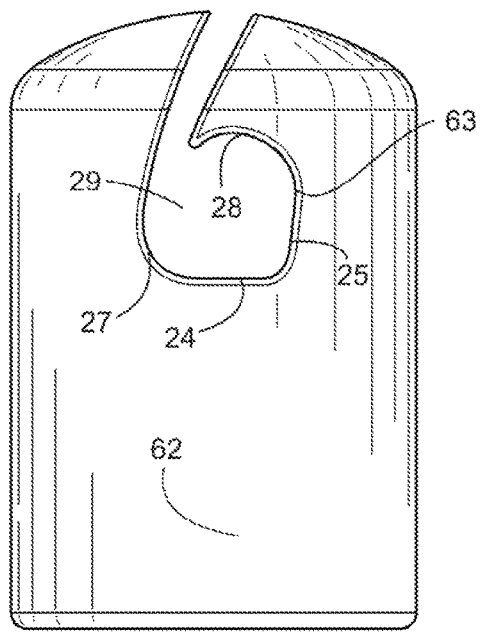
FIG. 12 is a side view of the leaf spring retainer.
Figure 13:
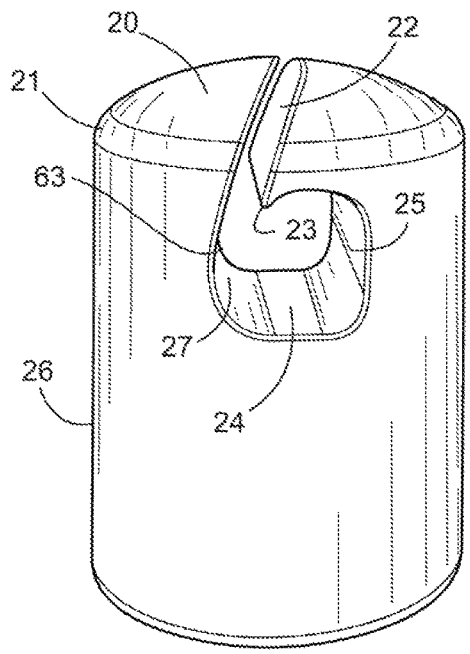
FIG. 13 is a front perspective view of the leaf spring retainer.
Figure 14:
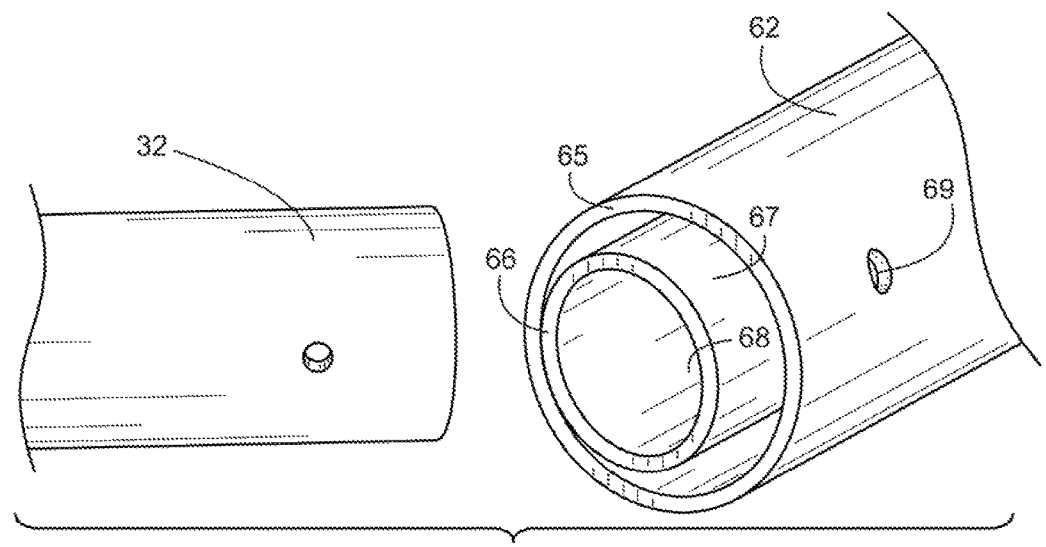
FIG. 14 is a connection view of the leaf spring retainer.

As seen in FIGS. 12-14, the retainer slot 63 generally includes a capturing cavity 29 and the angled slot 22. The retainer dome 20 has an angled slot 22 cut at an apex of the retainer dome 20. The angled slot has a pair of faces for receiving the leaf spring. The angled slot 22 extends to the capturing cavity 29. The angled slot 22 defines an angled slot hook 23 and a capturing cavity arched ceiling 28. The leaf spring is captured into the capturing cavity 29 when inserted. During insertion, the capturing cavity angled slot slope 27 biases the leaf spring into the capturing cavity 29 so that the leaf spring passes the angled slot hook 23 to be retained within the capturing cavity 29. To provide leeway or a loose enough fit to allow easy insertion of the leaf spring into all of the leaf spring retainers 62, the capturing cavity preferably includes a capturing cavity flat lower face 24 and a capturing cavity flat inside face 25.

The retainer slot 63 can be formed on a plastic upper endcap covering an upper end of the trampoline enclosure pole 32. The leaf spring retainer can be formed with an leaf spring retainer outside tube 65 and a leaf spring retainer inside tube 66 inside the leaf spring retainer outside tube 65. The leaf spring retainer 62 has a leaf spring retainer tube gap 67. The leaf spring retainer inside tube 66 can have a leaf spring retainer inside tube hollow 68. The leaf spring retainer connector opening 69 on the leaf spring retainer 62 extends through the trampoline enclosure pole 32 and can receive a screw or bolt for securing to the trampoline enclosure pole 32.

The leaf spring retainer can be formed of high density polyethylene with an ultraviolet inhibitor. The leaf spring retainer prevents rotation of the leaf spring and maintains the leaf spring in a vertically oriented position where the vertical height is greater than a horizontal width.

The sections of the leaf spring 41 can be connected together to form a single leaf spring in a long strip. The connection between the sections can be made in a quick connection configuration without needing bolts and nuts. The quick connection connector can be used with or without nuts and bolts. The quick connection connector could include additional safety locking mechanisms such as connectors.

Figure 7:
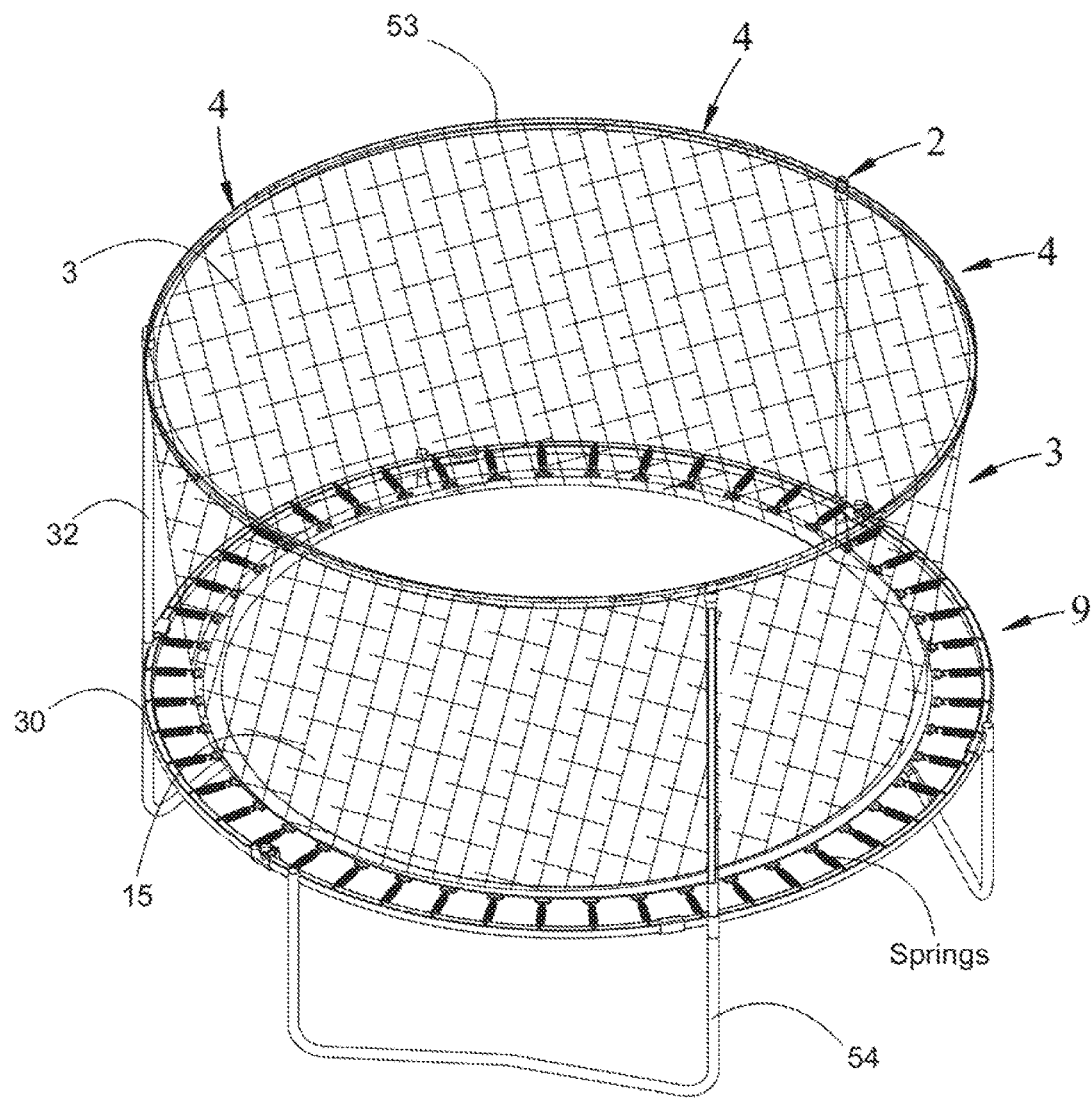
FIG. 7 is a diagram of the present trampoline enclosure device installed on a trampoline.
Figure 8:
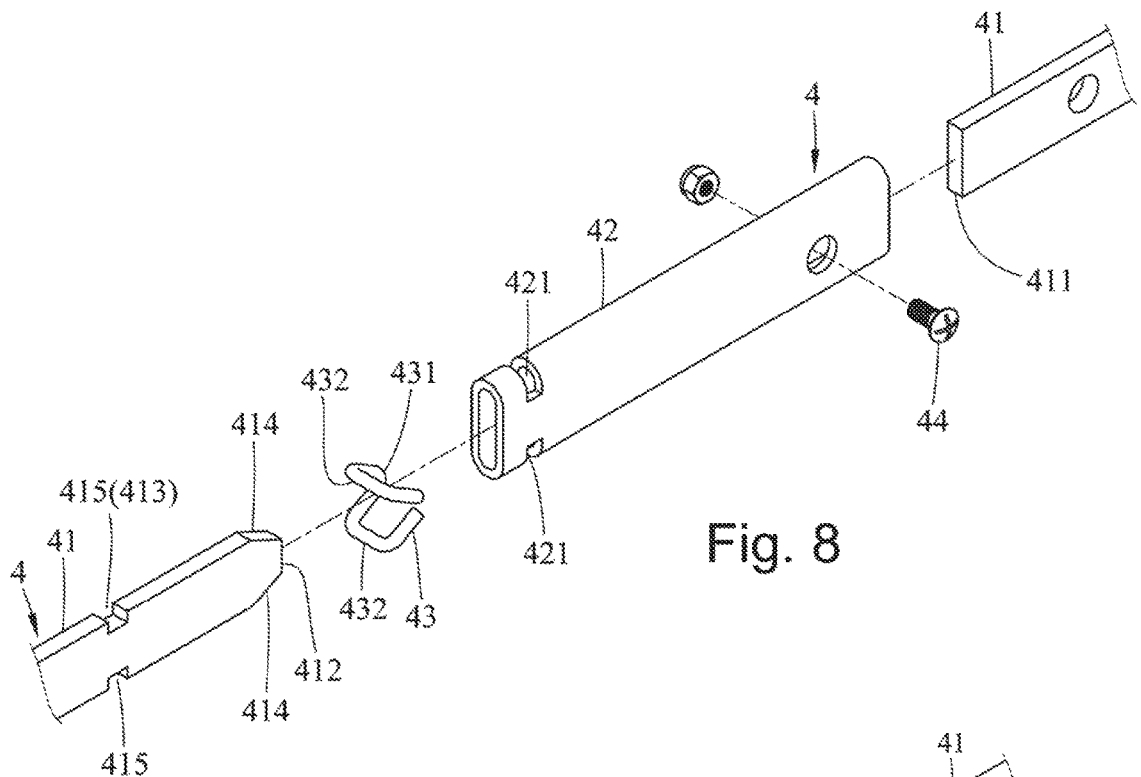
FIG. 8 is a partial exploded view of two mesh connecting units.
Figure 9:
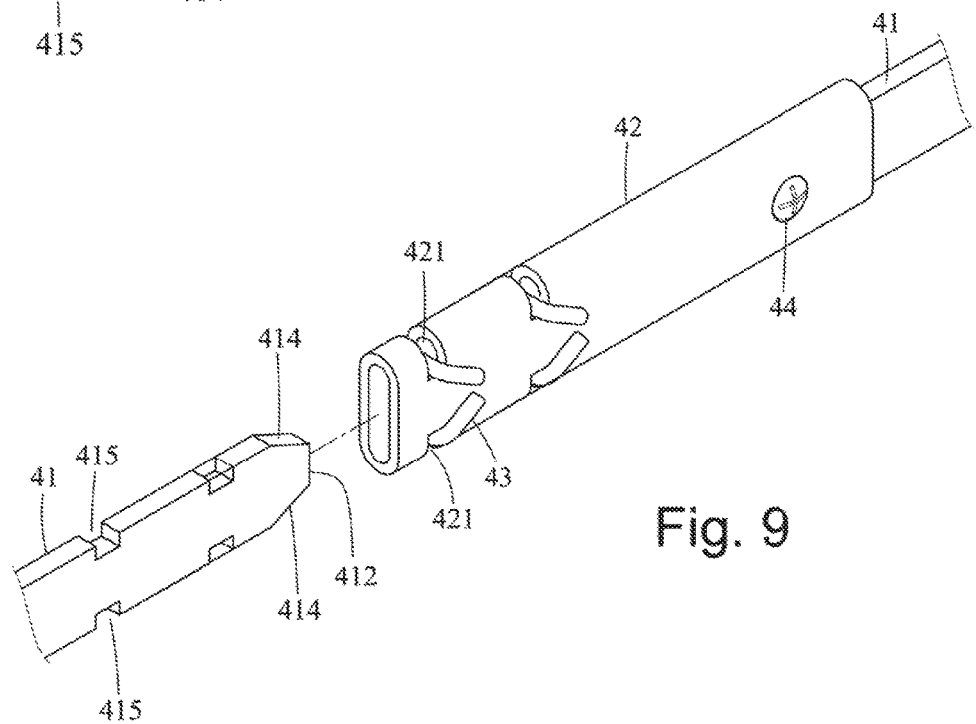
FIG. 9 another partial exploded view of the mesh connection units.
Figure 10:
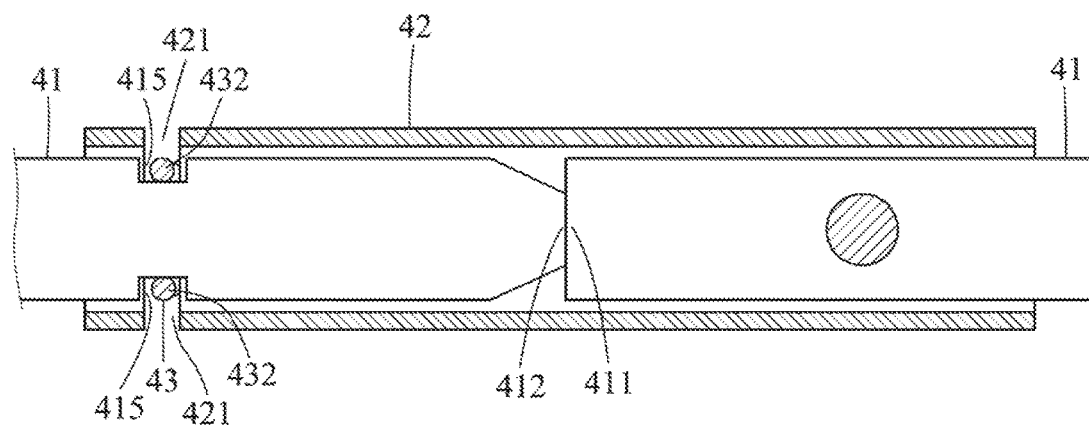
FIG. 10 is a partial section view of the mesh connecting unit.
Figure 11:
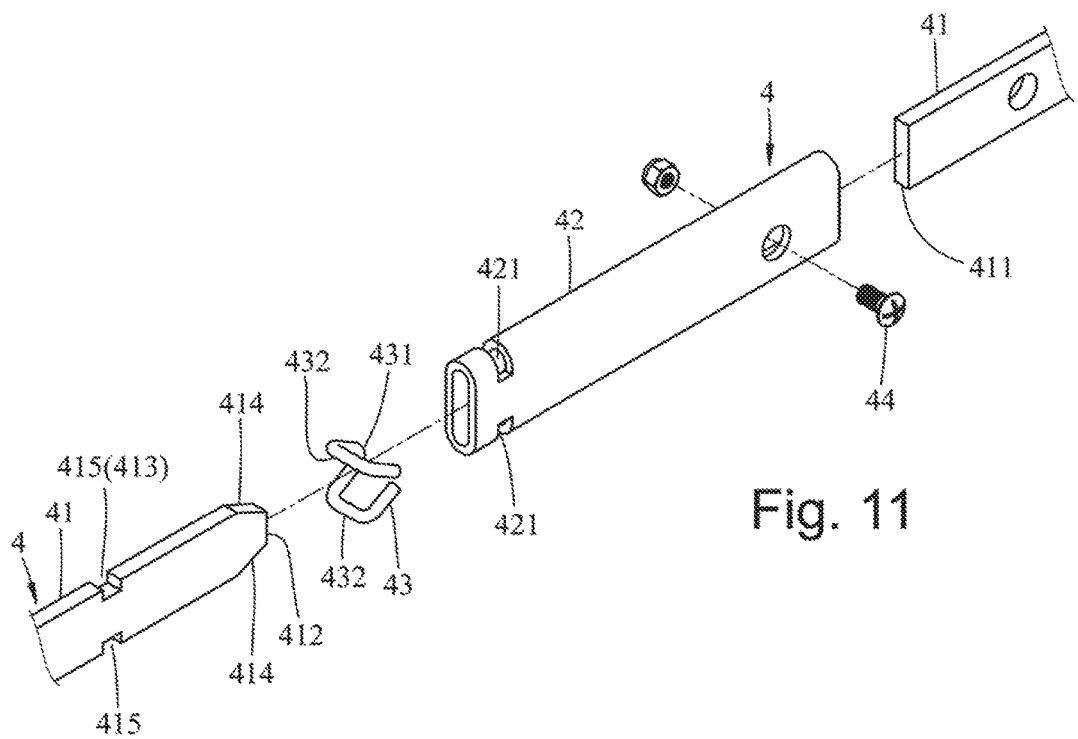
FIG. 11 is another partial exploded view of the mesh connection units.

As is shown in FIG. 7, the trampoline 9 generally includes a support frame 2, an enclosure 3 and multiple mesh connecting units 4. The mesh connecting units 4 can be formed as leaf springs 41. The mesh connecting units 4 support the mesh which can be formed as a thin or thick weave or double layer net for retaining users within the bounding area above the trampoline bed. The weave of the mesh may have a variety of different configurations such as hexagonal or quadrilateral orientations.

The support frame 2 is equipped on the trampoline 9, and extends upwardly from the trampoline 9 via trampoline enclosure support poles. The enclosure 3 is used to enclose the space above the trampoline 9 to prevent users such as children from falling out of the trampoline 9. The mesh connecting units 4 can be detachably connected to each other in a ring shape, and are mounted on the top of the support frame 2 as part of this enclosure 3 and naturally hang. Each mesh connecting unit 4 may have a leaf spring 41, a connecting sleeve 42, a buckle 43 equipped in this connecting sleeve 42 and a screw 44.

As seen in FIGS. 8-11, each leaf spring 41 is preferably an elongated strip of galvanized steel having a flat cross-section. When the leaf spring 41 is mounted on the support frame 2, its height in the vertical direction should be greater than its thickness in the horizontal direction as previously described above. The leaf spring 41 also includes a head 411 as part of the connecting sleeve 42 and an end 412 opposite to the head 411. A buckling part 413 of the leaf spring is adjacent to the end 412. The connecting sleeve 42 of a consecutive mesh connecting unit 4 can be detachably buckled via the buckle clip 43 of the consecutive mesh connecting unit 4 at the two guide bevels 414. The buckling part 413 of each leaf spring 41 has two grooves 415 which can receive and be retained by the clamping part 432 on the two opposite sides.

The base 431 is formed as a spring such as a torsion spring or a clip spring that is biased to a pinching configuration where the upper and lower clamping part 432 are biased toward each other. The upper and lower clamping part 432 engage into the threading slots 421 which limit their motion. The guide bevels 414 are respectively formed in two sides of the end 412 and progressively converge and angle towards the end 412. The guide bevels 414 provide an engagement surface against the clamping parts 432 that spreads them apart from each other. The base 431 of the buckle clip 43 can be attached to the connecting sleeve 42. Each connecting sleeve 42 forms two threading slots 421 as grooves 415 for respectively receiving the clamping parts 432.

Each leaf spring 41 may additional pairs of grooves 415, such as one, two, three or more. Correspondingly, the connecting sleeve 42 would also include corresponding threading slots 421 for receiving additional clips. Increasing the number of the threading slots 412 and the grooves 415 distributes stress more evenly and provides stronger engagement. The number and mounting positions can be determined based on design and need not be restricted. The buckle clip 43 includes a base 431 and two clamping parts 432 which respectively extend from both sides of the base 431. The clamping parts 432 are respectively equipped in the threading slots 421 and can be detachably buckled to the grooves 415.

A screw 44 can be used instead of a first bolt 46 or a second bolt 47. The screw 44 can be replaced by a rivet for example. A screw 44 can be used to fix the head 411 of the leaf spring 41 and its corresponding connecting sleeve 42. Each mesh connecting unit 4 can be partially assembled in advance in the factory for user to assemble. The head 411 of the leaf spring 41 is screw-fastened with the described connecting sleeve 42 with the screw 44, and the buckle clip 43 can be installed in the threading slot 421 before the device is shipped. When users receive the product and want to assemble the product, they simply need to insert the head 412 of each leaf spring 41 to the other end of the connecting sleeve 42. Then the guide bevels 414 will push outwardly against the two clamping parts 432 of the buckle 43 so that the leaf spring 41 clicks into place when the clamping parts 432 clamp the groove 415. In this way, users can have a snap together quick set up of the mesh connecting unit 4.

Because users can assemble the mesh connecting unit 4 without tools, the assembly time is decreased. When users finish using the trampoline enclosure device and need to disassemble it, they only need to use needle nose pliers to separate the two clamping parts 432 of the buckle clip 43. Then, the buckle clip 43 disengages and a user can detach the end 412 of the leaf spring 41 from the connecting sleeve 42. Therefore, this assembly is also fast and simple. If users lack needle nose pliers, they can also remove the screw 44 with a screwdriver since the head 411 of the leaf spring 41 is connected to the connecting sleeve 42 with the screw 44. Therefore, the trampoline enclosure device also provides an alternative to disassembly.

The key features of the present invention can be summarized as follows. First, through the leaf spring 41, the connecting sleeve 42 and the buckle 43 and the buckling part 413 of the leaf spring 41 to which the buckle 43 can be detachably buckled. During installation, users only need to insert the leaf spring 41 into this connecting sleeve 42 in order to complete the assembly. Hence, the users can assemble the mesh connecting unit 4 without any tool. Compared with the prior art, the present embodiment can increase the assembling speed. Furthermore, since no small components are needed during the assembly, the present invention is different from the prior art in which assembly might not be completed due to the loss of small components. Second, since each leaf spring 41 is equipped with the groove 415 and the corresponding threading slot 412 is mounted in each connecting sleeve 42, and the buckle 43 can be buckled in a simple framework, the production process is simpler and the production costs are lower and the durability and service life is greater. Third, since the height of each leaf spring 41 in the vertical direction is greater than its thickness in the horizontal direction, the structural strength of the leaf spring 41 in the vertical direction is increased without being too stiff. Fourth, by fastening the head 411 of the leaf spring 41 and the connecting sleeve 42 via the screw 44, users, aside from dissembling with pliers, can also use a screwdriver. Fifth, the guide bevels 414 allow the leaf spring 41 to more easily slide into the connecting sleeve 42 to provide a snap fit.

The above-mentioned descriptions are only embodiments of the present invention. Modifications and changes may be made by a person of ordinary skill in the art within the patent scope of the present invention, and should not be limited to what are detailed in the embodiments.

The invention claimed is:

1. A spring enclosure trampoline comprising:
   a. a trampoline bed connected across a horizontal frame member, wherein the trampoline bed is supported by a plurality of springs;
   b. trampoline legs supporting the horizontal frame member above a ground surface;
   c. a trampoline enclosure including a trampoline enclosure net supported from a spring enclosure netting support, wherein the trampoline enclosure surrounds the trampoline bed and wherein the trampoline enclosure is supported on a trampoline pole, wherein the spring enclosure netting support is formed as a leaf spring, wherein the leaf spring is flexible in a horizontal direction and in a vertical direction, wherein a leaf spring vertical dimension is greater than a leaf spring horizontal dimension, wherein the leaf spring is formed as an elongated strip; and
   d. a horizontal spring constant of the leaf spring, and a vertical spring constant of the leaf spring, wherein the horizontal spring constant is less than the vertical spring constant so that the leaf spring is resiliently flexible in the vertical direction and in the horizontal direction, but is more stiff in the vertical direction; and
   e. an enclosure sleeve of the trampoline enclosure, wherein the trampoline enclosure net is suspended from the enclosure sleeve.

2. The spring enclosure trampoline of claim 1, further including an adjacent leaf spring, wherein the adjacent leaf spring has a head and an end, wherein the end has a connecting sleeve, wherein the connecting sleeve has a buckle, wherein the buckle secures the leaf spring to the adjacent leaf spring.

3. The spring enclosure trampoline of claim 2, wherein the buckle is formed as a wire clip.

4. The spring enclosure trampoline of claim 3, wherein the buckle has a pair of clamping parts, including an upper clamping part and a lower clamping part, wherein the pair of clamping parts engages a pair of grooves formed on the head portion of the adjacent leaf spring, wherein the upper clamping part engages an upper groove of the pair of grooves, and wherein the lower clamping part engages a lower groove of the pair of grooves.

5. The spring enclosure trampoline of claim 3, wherein the connecting sleeve is connected to the end of the adjacent leaf spring by a bolt or screw.

6. The spring enclosure trampoline of claim 3, wherein the leaf spring also includes a pair of bevels formed on an end of the leaf spring, wherein the pair of bevels are configured to expand the buckle when the pair of bevels are inserted through the buckle.

7. The spring enclosure trampoline of claim 2, wherein the buckle has a pair of clamping parts, including an upper clamping part and a lower clamping part, wherein the pair of clamping parts engages a pair of grooves formed on the head portion of the adjacent leaf spring, wherein the upper clamping part engages an upper groove of the pair of grooves, and wherein the lower clamping part engages a lower groove of the pair of grooves.

8. The spring enclosure trampoline of claim 2, wherein the connecting sleeve is connected to the end of the adjacent leaf spring by a bolt or screw.

9. The spring enclosure trampoline of claim 2, wherein the leaf spring also includes a pair of bevels formed on an end, of the leaf spring, wherein the pair of bevels are configured to expand the buckle when the pair of bevels are inserted through the buckle.

10. The spring enclosure trampoline of claim 1, wherein the leaf spring is formed from multiple sections connected together at a leaf spring connector.

11. The spring enclosure trampoline of claim 1, wherein the leaf spring has a pair of leaf spring openings that receive bolts, wherein the pair of leaf spring openings includes a leaf spring first opening and a leaf spring second opening.

12. The spring enclosure trampoline of claim 1, wherein the leaf spring has a leaf spring cover fitted over at least an upper edge of the leaf spring.

13. The spring enclosure trampoline of claim 1, further including a leaf spring retainer attached to the trampoline pole, wherein the leaf spring retainer has a retainer slot that clips the leaf spring to limit rotation of the leaf spring within the retainer slot.

14. The spring enclosure trampoline of claim 1, further including a leaf spring cover laminated over at least a portion of the leaf spring.

15. The spring enclosure trampoline of claim 1, wherein the enclosure pole has a upper endcap covering it, wherein the upper endcap has an angled retainer slot and a capturing cavity.

* * * * *